United States Patent
Bailey et al.

(10) Patent No.: US 9,722,859 B2
(45) Date of Patent: *Aug. 1, 2017

(54) EVALUATION OF FIELD REPLACEABLE UNIT DEPENDENCIES AND CONNECTIONS

(71) Applicant: International Business Machines Corporation, Armonk, NY (US)

(72) Inventors: Sheldon R. Bailey, Rochester, MN (US); Brent W. Jacobs, Rochester, MN (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 618 days.

This patent is subject to a terminal disclaimer.

(21) Appl. No.: 14/161,945

(22) Filed: Jan. 23, 2014

(65) Prior Publication Data
US 2015/0205617 A1 Jul. 23, 2015

(51) Int. Cl.
G06F 15/177 (2006.01)
H04L 12/24 (2006.01)
G06F 9/44 (2006.01)
H04L 12/26 (2006.01)
G06F 9/445 (2006.01)

(52) U.S. Cl.
CPC .......... H04L 41/042 (2013.01); G06F 9/4411 (2013.01); H04L 41/0663 (2013.01); H04L 43/0817 (2013.01); G06F 9/445 (2013.01); G06F 15/177 (2013.01)

(58) Field of Classification Search
None
See application file for complete search history.

(56) References Cited

U.S. PATENT DOCUMENTS

| 4,967,344 | A | * | 10/1990 | Scavezze | G06F 11/2007 714/4.5 |
| 5,588,112 | A |   | 12/1996 | Dearth et al. | |
| 5,892,973 | A |   | 4/1999  | Martinez et al. | |
| 6,550,019 | B1 |   | 4/2003  | Ahrens et al. | |
| 7,467,204 | B2 |   | 12/2008 | Fields, Jr. et al. | |
| 7,971,045 | B1 | * | 6/2011  | Currid | G06F 9/4416 709/226 |
| 7,996,497 | B2 | * | 8/2011  | Jones | G06F 11/006 709/220 |
| 8,140,335 | B2 |   | 3/2012  | Kennewick et al. | |

(Continued)

*Primary Examiner* — Viet Vu
*Assistant Examiner* — James Edwards
(74) *Attorney, Agent, or Firm* — Patterson + Sheridan, LLP

(57) ABSTRACT

To select a master controller from a plurality of controllers, a computing system may consider whether connections between components within field replaceable units (FRUs) are functional as well as the data dependencies between the FRUs. For example, in addition to identifying whether the connections between the FRUs and the controllers are functional, the computing system sends instructions to each of the FRUs coupled to the controllers to determine if inter- and intra-FRU connections required for booting a compute node hosting the FRUs are functional. For instance, one FRU may depend on data from another FRU in order to boot. If a communication link between the FRUs is non-functional, the compute node may fail to boot. The computer system uses these evaluations to determine which of the controllers to select as the master.

11 Claims, 6 Drawing Sheets

(56) References Cited

U.S. PATENT DOCUMENTS

| | | | |
|---|---|---|---|
| 2004/0003082 A1* | 1/2004 | Abbondanzio | H04L 67/34 709/225 |
| 2005/0099766 A1* | 5/2005 | Fraley | G11B 27/36 361/679.33 |
| 2005/0122942 A1* | 6/2005 | Rhee | H04W 28/08 370/338 |
| 2006/0179184 A1 | 8/2006 | Fields et al. | |
| 2007/0016663 A1* | 1/2007 | Weis | G06F 11/2028 709/223 |
| 2007/0022426 A1* | 1/2007 | Steinder | G06F 9/505 718/104 |
| 2010/0153670 A1 | 6/2010 | Dodgson et al. | |
| 2010/0153679 A1* | 6/2010 | Abdul | G06F 9/5011 711/173 |
| 2010/0332654 A1* | 12/2010 | Bose | G06F 9/4443 709/224 |
| 2013/0151829 A1* | 6/2013 | Amann | G06F 9/4401 713/2 |
| 2013/0159532 A1* | 6/2013 | Boero | H04L 47/827 709/226 |
| 2015/0205618 A1 | 7/2015 | Bailey et al. | |

* cited by examiner

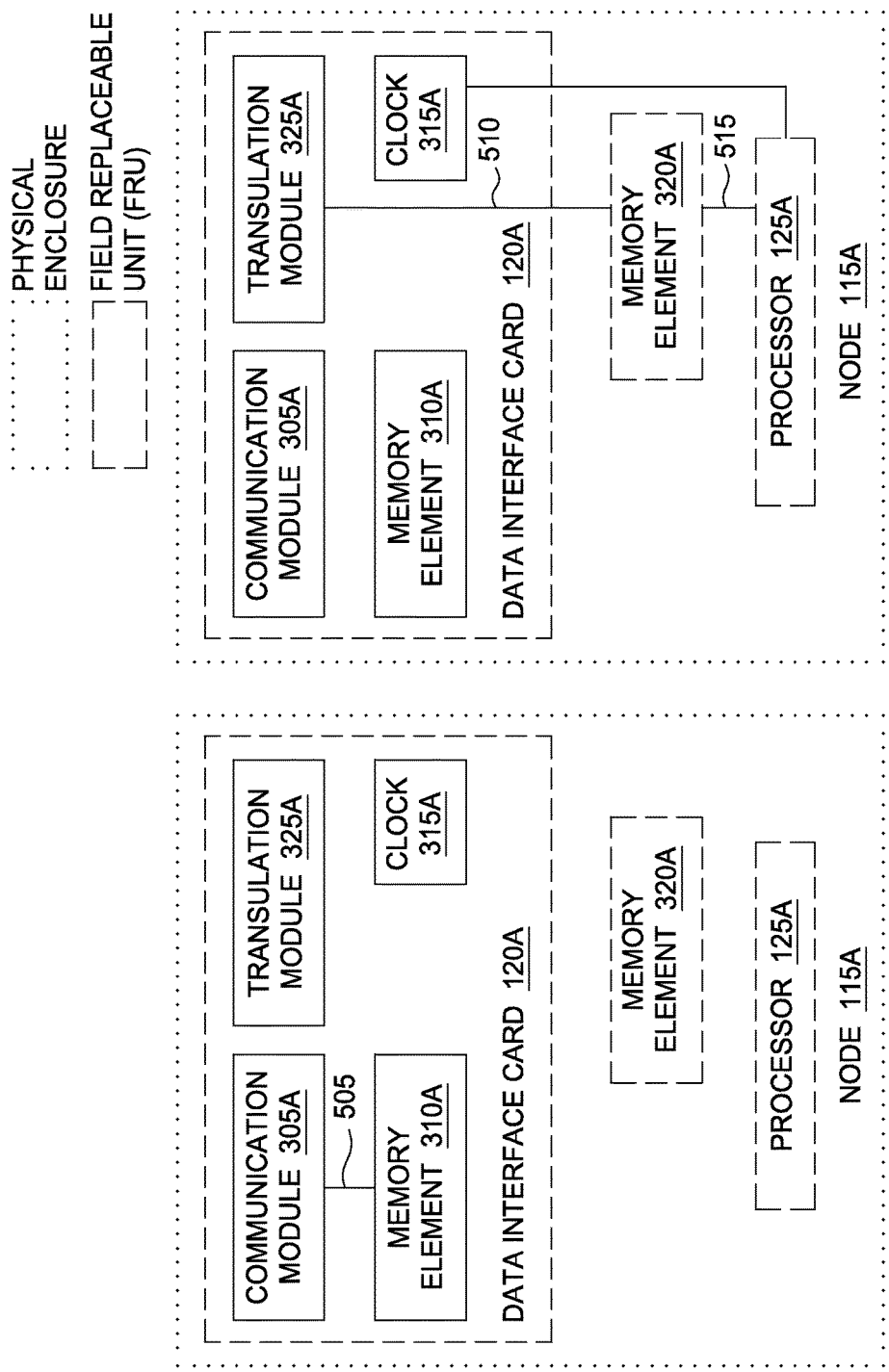

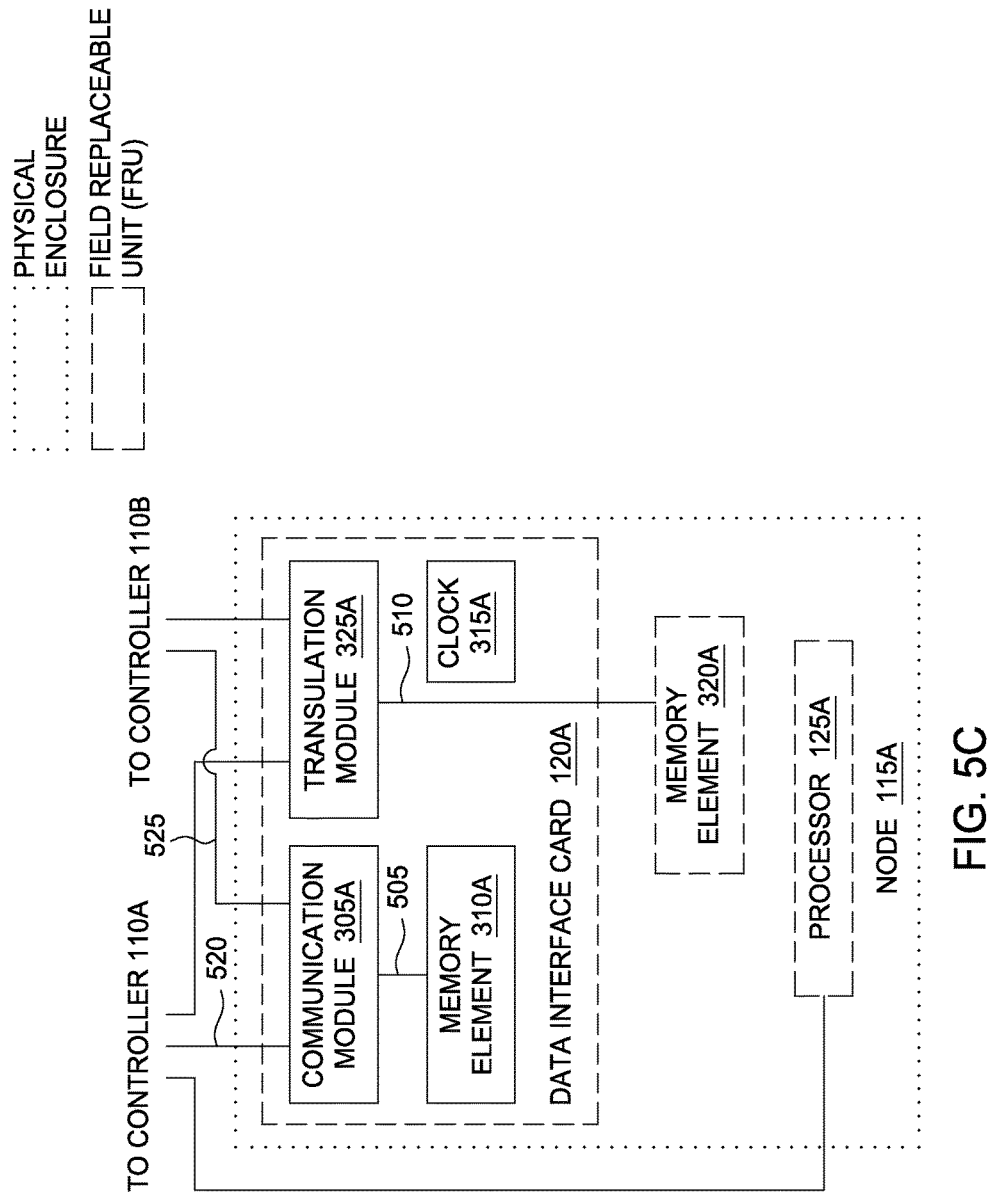

EVALUATION OF FIELD REPLACEABLE UNIT DEPENDENCIES AND CONNECTIONS

BACKGROUND

To increase availability, a computing system may include redundant components that may form master-servant relationships where if the master fails, the servant takes over. For example, the computing system may have two controllers that are interconnected. The system may use only one of these controllers to perform a special function such as, for example, booting the system. The unused controller may be placed in a standby mode such that if the master fails, the servant controller can be used instead.

In a distributed system, the choice of which controller to use may affect the system's performance. For example, the distributed system may include a plurality of nodes that communicatively coupled to the controllers. If one of the communication links between the nodes and the controllers has failed, that controller may be unable, e.g., to boot the node. Accordingly, selecting which of the plurality of controllers acts as the master affects the availability of the system.

SUMMARY

One embodiment disclosed herein is a method that provides a plurality of controllers, each with at least one connection to a plurality of compute nodes, each compute node comprising at least one field replaceable unit (FRU). The method determines a status of an inter-FRU connection between a first FRU and a second FRU in a same one of the plurality of compute nodes where the inter-FRU connection is required in order to initialize the first FRU during a system boot. The method also determines a status of an intra-FRU connection between components within the first FRU where the intra-FRU connection is required in order to initialize the first FRU during the system boot. The method determines a status of connections between each of the plurality of controllers and at least one FRU in each of the plurality of computer nodes. The method selects, based on the statuses, a master controller from the plurality of controllers to use when performing the system boot to initialize the plurality of compute nodes Another embodiment presented herein is a computer program product for selecting a master controller from a plurality of controllers, each with at least one connection to a plurality of compute nodes. The computer program product includes computer-readable storage medium having computer readable program code configured to determine a status of an inter-FRU connection between a first FRU and a second FRU in a same one of the plurality of compute nodes where the inter-FRU connection is required in order to initialize the first FRU during a system boot. The program code is also configured to determine a status of an intra-FRU connection between components within the first FRU where the intra-FRU connection is required in order to initialize the first FRU during the system boot. The program code is configured to determine a status of connections between each of the plurality of controllers and at least one FRU in each of the plurality of computer nodes and select, based on the statuses, a master controller from the plurality of controllers to use when performing the system boot to initialize the plurality of compute nodes.

Another embodiment presented herein is a system that includes a plurality of controllers and a plurality of compute nodes where each compute node comprises at least one field replaceable unit and each controller comprises at least one connection to each of the plurality of compute nodes. The system also includes control logic configured to determine a status of an inter-FRU connection between a first FRU and a second FRU in a same one of the plurality of compute nodes where the first connection is required in order to initialize the first FRU during a system boot. The control logic is also configured to determine a status of an intra-FRU connection between components within the first FRU where the intra-FRU connection is required in order to initialize the first FRU during the system boot. The control logic is also configured to determine a status of connections between each of the plurality of controllers and at least one FRU in each of the plurality of computer nodes and select, based on the statuses, a master controller from the plurality of controllers to use when performing the system boot to initialize the plurality of compute nodes.

BRIEF DESCRIPTION OF THE DRAWINGS

So that the manner in which the above recited aspects are attained and can be understood in detail, a more particular description of embodiments of the invention, briefly summarized above, may be had by reference to the appended drawings.

It is to be noted, however, that the appended drawings illustrate only typical embodiments of this invention and are therefore not to be considered limiting of its scope, for the invention may admit to other equally effective embodiments.

FIGS. 5A-5C illustrate evaluating data dependencies within a computing system when selecting the master controller, according to one embodiment described herein.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Figure 1:
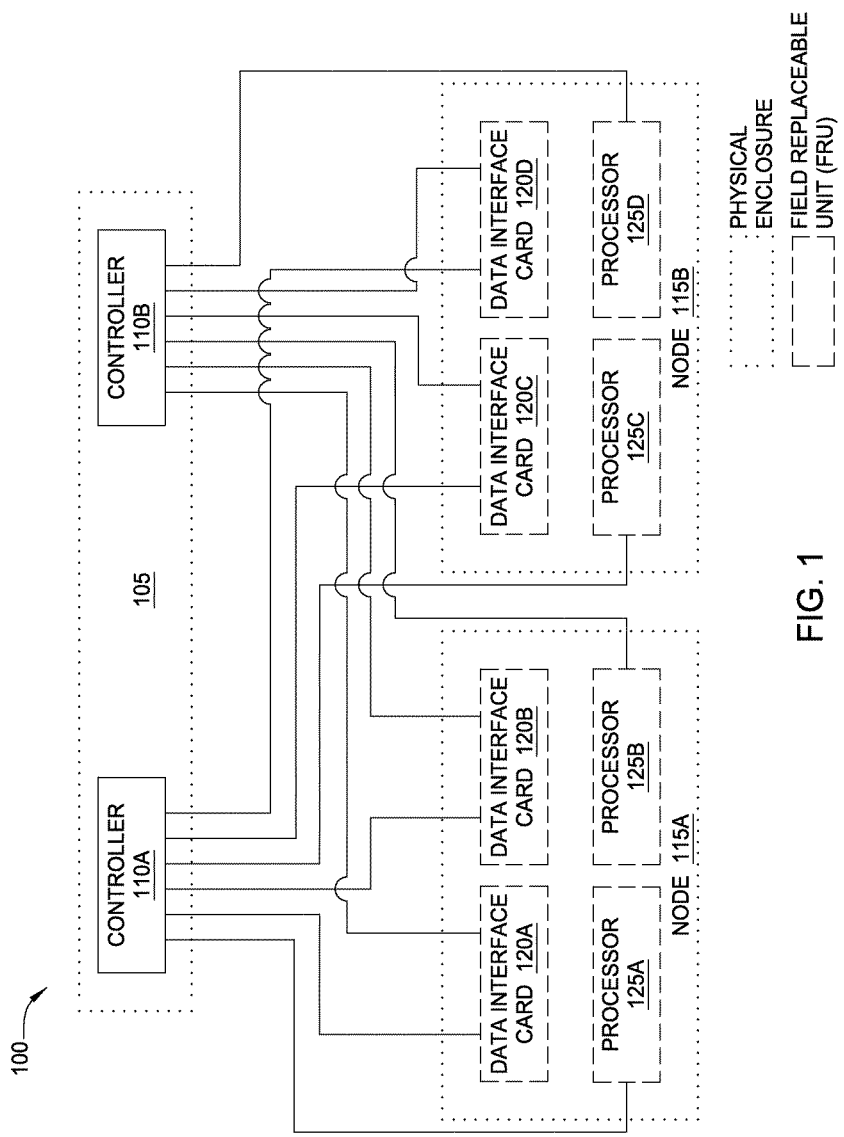
FIG. 1 is a system diagram with a plurality of connected field replaceable units, according to one embodiment described herein.

A computing system may include a plurality of redundant components in order to increase the availability of the system. For example, the system may include redundant compute nodes that themselves contain redundant components—e.g., redundant processors, memories, interface cards, and the like. In one example, the redundant components may be field replaceable units (FRUs). A FRU may be a circuit board, part, or assembly that can be quickly and easily removed from a compute device and replaced. In one embodiment, the FRU includes an independent substrate or structure that supports the various components within the FRU. Non-limiting examples of FRUs include line-replaceable units, memory packages, PCB cards, motherboards, and the like. A FRU allows a technician lacking in-depth product knowledge to isolate and replace faulty components. If one component in the FRU is non-functional, thereby limiting the function of the computing system, the entire FRU may be easily replaced.

The computing system may include a plurality of firmware controllers that boot up the individual nodes in the computing system. The firmware controllers may have respective connections to the various FRUs in the nodes. The computing system may choose which of the controllers to select as the master controller based on the number of nodes each controller is able to boot. To successful boot the node, the controller may need a functional connection to certain FRUs in the nodes. For example, the controller may need a connection to a processor and a data interface card within the node in order to boot the node successfully. However, relying on the functional connections between the FRUs and the controllers does not consider data dependencies between the FRUs as well as functional connections between components within the FRUs themselves.

In one embodiment, the computing system may consider whether the components within the FRUs are functional as well as the data dependencies between the FRUs when determining which controller to designate as the master. To do so, the computing system may identify what FRUs and what components within the FRU are needed to boot the node. The computing system may then send instructions to each of the FRUs to determine if these components are functional. For example, a data interface card may include an internal memory element that stores data required when booting the node. Even though the connection between the controllers and the data interface card may be functional, if the memory element is not functional, the controller is unable to boot the compute node. Similarly, one FRU may depend on data from another FRU in order to boot. For example, a processor may need a clock signal from the data interface card. If the clock or the communication link between the clock and the processor is non-functional, the node may fail to boot.

To select the appropriate controller as the master, the computing system may calculate a score for each controller. Instead of these scores relying only on the number of functional connections between the controllers and the FRUs, the computing system may also consider the functionality of the components within the FRUs and the data dependencies between the FRUs. For example, if a controller has a functional connection to a FRU but that FRU requires data from a non-functional component, the computing system may not increase the controller's score. By evaluating other factors besides the number of functional connections between a controller and the FRUs, the computing system may be able to select as the master the controller that is able to boot the most nodes in the system.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

FIG. 1 is a system diagram with a plurality of connected FRUs, according to one embodiment described herein. As shown, a computing system 100 includes a plurality of physical enclosures 105, 115A, and 115B. Each physical enclosure may provide support and communication links between one or more FRUs (illustrates in the dashed lines). The enclosures may take on any form or size and may be arranged in a support structure such as a rack. The computing system 100 includes communication paths to share data between the enclosures. These communication paths may include Ethernet cables, PCI links, Infiniband® links (a registered trademark of InfiniBand Trade Association), optical fiber, and the like. In one embodiment, however, the FRUs may all be located in a single physical enclosure.

Enclosure 105 includes two or more controllers 110. In one embodiment, the controllers are redundant (i.e., substantially the same) such controller 110A can perform the same tasks as controller 110B, and vice versa. In one embodiment, the controllers 110 may execute firmware for controlling the FRUs in the system 100 (e.g., firmware service processors). As such, the controllers 110 may be respective integrated circuits within a FRU. In one example, the controllers 110 are tasked with booting or initializing the nodes 115 (also called an initial program load). Because the controllers 110 may be redundant, the computing system 100 may determine which controller 110 is the master while the rest of the controllers 110 are servants. If the master controller fails, one of the servant controllers can then take over to complete the task.

Each node 115 may include redundant FRUs that are interconnected. In this example, each node 115 includes two data interface cards 120 and two processors 125. Before the master controller is selected, the FRUs in the nodes 115 may be treated as, e.g., parallel processing paths or parallel processing units. However, after the master controller is selected, the FRUs may also be organized in master/servant relationships. For example, if controller 110A is the master, it uses processor 125A as the master processor in node 115A (since controller 110A has a connection to this processor 125A) and processor 125B because the servant processor. When booting the nodes 115, a controller 110 may need only one connection to a FRU. For example, the processors 125A and 125B may be interconnected such that a connection to one of the processors 125 enables a controller 110 to boot the node 115. The computing system 100 may determine, before the system 100 is booted, which controller has a functional connection to the respective FRUs. Based on this information, the system 100 may choose the controller 110 with the most functional connections to the FRUs to increase the likelihood the node 115 will be booted. Although only two nodes 115 are shown, a computing system 100 may include any number of nodes 115.

Each FRU in the nodes 115 may include a connection to only one of the controllers 110 or multiple connections to each of the controllers 110. In this embodiment, each processor 125 includes a single connection to one of the controllers 110. If that connection fails (e.g., a wire is severed or unplugged), the other processor 125 in the node 115 may be used to boot or initialize the node 115. In other examples, the processors 125 may have a connection to each of the controllers 110 in the system 100. Because there are at least two processors 125 in the nodes 115 (but there can be more) with respective connections to different controllers 110, this increases the likelihood that at least one of those connections is functional, and thus, the node 115 can be booted. Unlike processors 125, the data interface cards 120 may include respective connections to each of the controllers 110. Even if the connection between card 120A and controller 110A fails, the connection between card 120A and controller 110B may still be functional. Thus, card 120A may still be booted assuming that controller 110B is selected as the master. As will be described in more detail below, the various connection paths between the controllers 110 and the FRUs in the nodes 115 may be serial or parallel data buses which are usable in a low power state.

Figure 2:
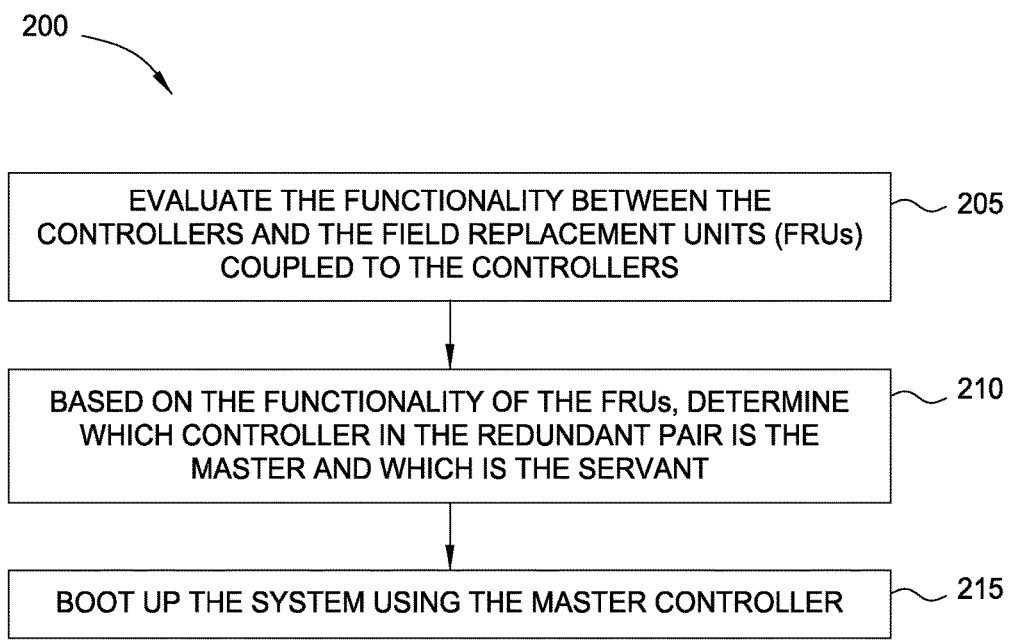
FIG. 2 is a flow chart for evaluating functionality between controllers and field replaceable units, according to one embodiment described herein.

FIG. 2 is a flow chart for evaluating functionality between controllers and FRUs in a compute node, according to one embodiment described herein. In one embodiment, method 200 may be performed prior to receiving a request to boot the computing system. For example, the enclosures shown in FIG. 1 may be connected to one or more power sources with causes the FRUs to be in a low power state. Although this state may not enable all the functions of the FRUs, the computing system may still be able to perform a discovery process to in order to determine which controller to designate as the master controller. Although the present embodiments discuss identifying a master controller when booting the computer system, this disclosure is not limited to such. For example, the same techniques may be used for determining a master/servant relationship between different controllers in the system after the computing system has booted and is operating.

At block 205, the computing system may evaluate the functionality between the controllers and the FRUs coupled to the controllers 205. For example, each controller may send discovery messages to each FRU the controller is communicatively coupled to—e.g., the processors and data interface cards shown in FIG. 1. In response, the FRUs may send a message back to the controllers thereby informing the controllers that the connection is functional. If a return message is not received, then the controller knows something is wrong with the connection (or the FRU is not operational) and the connection is not functional. The number of these functional connections may determine a score for the controller. Referring to FIG. 1, controller 110A may have a functional connection to data interface cards 120A, 120B, 120C, and 120D while controller 110B only has functional connections to data interface cards 120A, 120B, and 120D. Thus, the score for controller 110A may be higher than controller 110B. In this manner, at block 205, the computing system determines "the view" relative to each of the controllers 110, or more specifically, the number of FRUs that is functionally connected to each of the controllers 110.

At block 210, the computing system uses the score associated with each controller to determine which controller is the master and which is the servant. In one embodiment, the score may be a count of the number of functional connections. Alternatively, the score may be weighted based on the type of the FRUs. In some cases, one controller may have the same (or greater) number of functional connections than the other controller, but may not be able to boot up the node because the controller does not have a functional connection to a critical FRU—e.g., a processor. For example, assuming a computing system has two nodes, a first controller may have non-functional connections to the processors in the two nodes but have functional connections to all the data interface cards (i.e., four functional connections). Because the first controller is not functionally connected to the processors, it cannot boot any of the processors and thus the nodes would be unused. In contrast, the second controller may lack any functional connections to one node but have functional connections to a processor and the two data interface cards in the second node (i.e., three functional connections). The second controller has fewer functional connections than the first controller but is able to boot in one of the nodes while the first controller cannot boot any of the nodes. Thus, in one embodiment, the score can be assigned based on how many of the nodes each controller can boot rather than the number of functional connections to the FRUs. Of course, the number of functional connections needed in order to boot the nodes will vary depending on the particular arrangement of the redundant communication paths between the controllers and the FRUs.

In one embodiment, if the score is the same, the computing system may choose the master controller based on a priority score associated with the nodes themselves. That is, the nodes may be weighted differently based on, e.g., the type of applications executed by the nodes, hardware on the nodes, client preference, etc. In case of a tie, the controller with functional connections to the highest priority nodes may be designated as the master.

At block 215, the computing system may be booted using the designated master controller. For example, the administrator may decide to power on the computer system which switches the FRUs from the low power state to a boot or initialized state. The master controller may then communicate with the various FRUs in each of the nodes to bring the nodes into an operational state—e.g., begin executing operating systems, virtual machines, applications, and the like.

Although not shown in the computing system 100 of FIG. 1, the FRUs may have various connections between each other (e.g., from card 120A to processors 125A or from processors 125A to processor 125B) which are not included in FIG. 1. These various interconnections between the FRUs may create data dependencies that affect the ability of the FRUs to perform a task—e.g., boot the nodes 115. Thus, selecting the master controller based only on the functional connections between the controllers and the FRUs as done in method 200 of FIG. 2 may give an incomplete view of the computing system 100. For example, each processor 125 may receive a clock signal from the data interface card 120 in order to permit the processors 125 to transmit and receive certain types of data. Without this clock signal, the processors 125 may be unable to boot the node 115. Accordingly, in this scenario, although the controllers may have functional connections to the FRUs in the node, the processor may be unable to boot the FRUs. However, if the other controller were used as the master, then its direct connection to the other processor in the node may be used to boot the node (the processor with the faulty clock signal may remain unused).

Another reason using method 200 to select the controller may not boot the most number of nodes is because of internal faults within the FRUs. Even if the FRU has a functional connection to a controller, it may have an internal fault that prevents the FRU from performing its functional tasks. Thus, using the low power state to share messages between only the FRUs and the controller may provide a limited picture of the functionality of the computer system.

Figure 3:
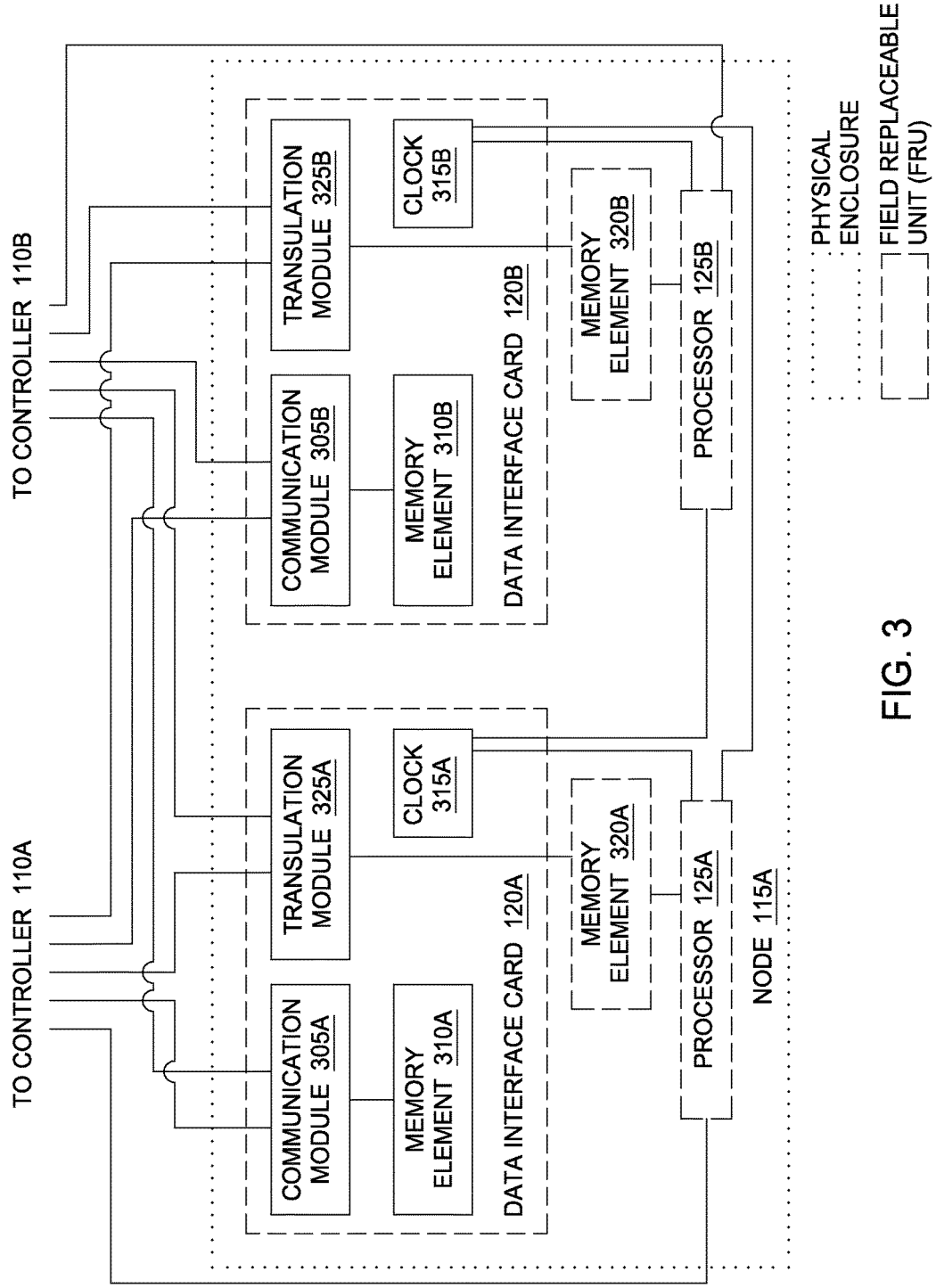
FIG. 3 illustrates data dependencies between field replacement units, according to one embodiment described herein.

FIG. 3 illustrates data dependencies between FRUs, according to one embodiment described herein. Specifically, FIG. 3 provides a more in-depth illustration of node 115A of FIG. 1. For example. The data interface cards 120A and 120B include separate elements such as communication modules 305A-B, memory elements 310A-B, clocks 315A-B, and translation modules 325A-B. The communication modules 305 may be semiconductor chips that provide the system with connections to various communications protocols or sub-systems. For example, the communication modules 325 may be a communication hub or adapter that connects the controllers 110A and 110B to other systems within node 115A.

The translation modules 325 may perform a data transformation which enables a controller 110 to access the data stored in the memory element 320. For example, an input of the translation module 325 may use one communication protocol (e.g., $I_2C$ or PCI) but an output of the translation module 325 coupled to the memory element 320 may used a different communication protocol. To access the memory element 320, a FRU or controller may send commands to the translation module 325 which converts the commands into the communication protocol used by the memory element 320. In one embodiment, the translation module 325 may also serve as a gatekeeper that allows multiple actors (e.g., multiple FRUs) to access the memory element 320.

As shown, each controller 110 has an individual physical connection to the communication modules 305 and translation modules 325. In this manner, the system includes parallel connections where the communication modules 305 and translation modules 325 may be controlled using either of the two controllers 110. Thus, if one of the connections is nonfunctional, the other controller may be selected as the master controller.

In addition to connections to the controllers 110, the different elements within a FRU may be interconnected. For example, communication module 305A is coupled to memory element 310A. These internal data connections (i.e., intra-FRU connections) may also determine whether the node 115A can be successfully booted or used when processing data. For instance, the translation module 325A may need to access data stored in the memory element 320A in order to properly boot or initialize—e.g., the memory element 320A may store configuration data used to perform an initial program load. In other embodiment, the data connections between FRUs (i.e., inter-FRU connections) may determine whether the node 115A can be successfully booted. For example, the processor 125A may need a clock signal from the clock 315A located in the data interface card 120A in order to boot node 115A.

Connections needed when booting or initializing the system are referred to generally herein as data dependencies. The data dependencies may be internal to a FRU (e.g., between communication module 305A and memory element 310A) or data dependencies between FRUs (e.g., clock 315A and processor 125A). However, not all connections between the modules may be needed in order to boot the node. For example, the translation module 325A may not need to get data from memory element 320A. Thus, if this connection is non-functional, the translation module 325A, and thus, the node 115A may still be able to initialize or boot.

Figure 4:
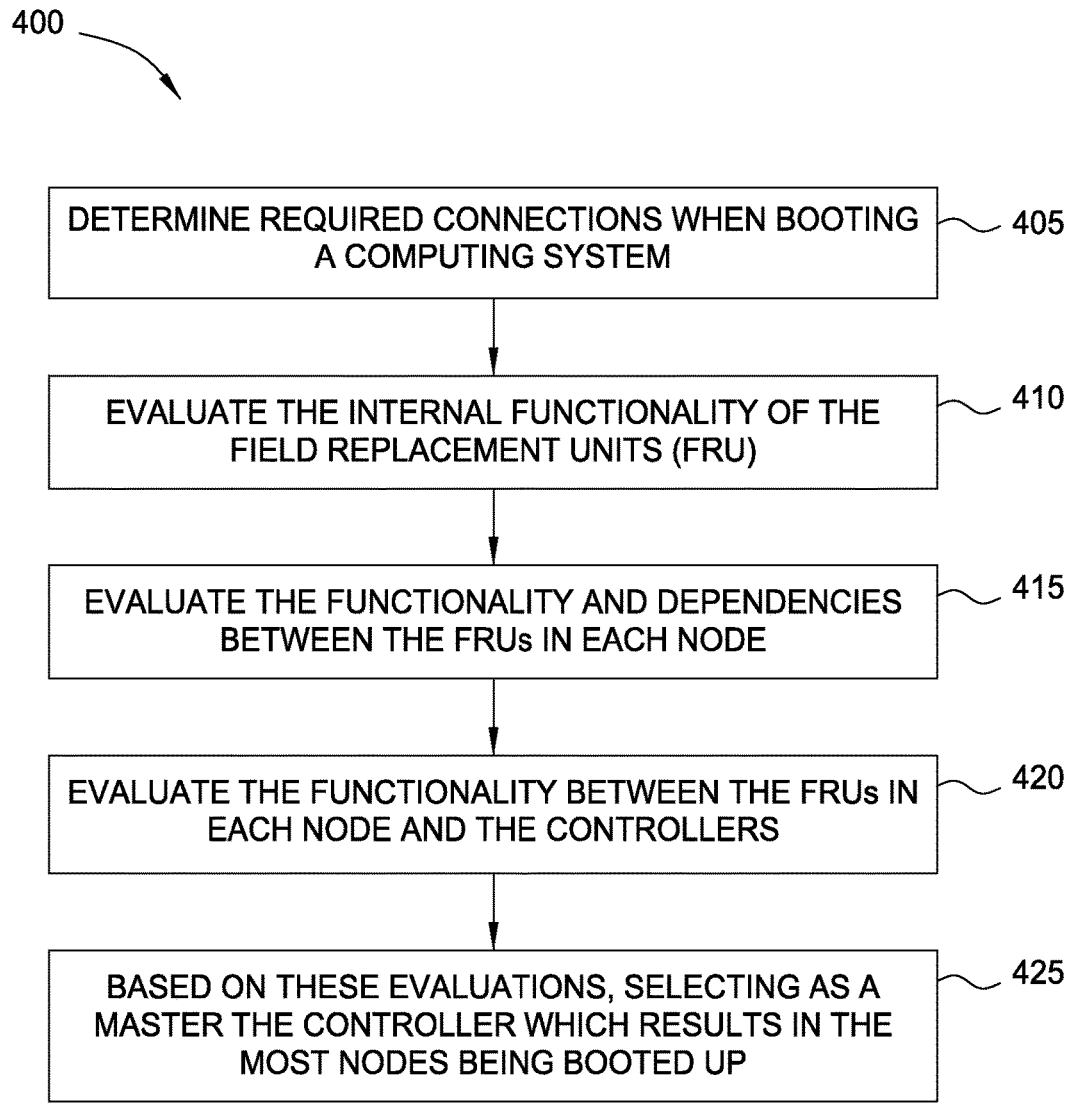
FIG. 4 is a flow chart for considering data dependencies when selecting a master controller, according to one embodiment described herein.

FIG. 4 is a flow chart for considering data dependencies when selecting a master controller, according to one embodiment described herein. Certain blocks of method 400 are discussed in parallel with FIGS. 5A-5C that illustrate evaluating data dependencies within a computing device when selecting the master controller. At block 405 of method 400, the system may determine the required connections need when booting a computing system. In one embodiment, the controllers may use control logic (e.g., hardware, firmware, software, or some combination thereof) to probe each node and identify the data dependent connections required to properly initialize the node. Alternatively, the system designer may have already identified the required connections. For instance, the system designer may know that a functional connection between the memory element and the translation module is required for the node to boot and work properly. These data dependencies may, in this embodiment, already be known to the controllers and the FRUs themselves. The rest of the blocks in FIG. 4 illustrate a technique for identifying the status of these data dependencies.

At block 410, the controllers may evaluate the internal functionality (e.g., the internal data dependencies or intra-FRU dependencies) of each the FRUs in the node connected to a controller. As mentioned above, the controllers may send instructions to the FRUs in the node. The instructions may use a low-power technique for transmitting information to the FRUs even before the system has booted. For FRUs that have multiple components, these components (e.g., the translation module or communication module) receive the messages from the controllers and probe the internal connections that were identified at block 405. The components may either receive a list of internal connections to test or may include a preconfigured list of the relevant connections that should be tested. If these intra-FRU connections are not functional, then the component may return a message to the respective controller that the component will not get the information it needs to initialize or boot. In one embodiment, based on the status, the controller may update a score to reflect that the component (or node) will not boot.

Each controller may send out the messages to each of the node and FRUs to which it is coupled. In one embodiment, the control logic in the FRUs (e.g., hardware, firmware, software, or some combination thereof), for example, may then transmit a new instruction or test packet to the various components in the FRUs that were identified at block 405 (e.g., a memory element or a clock). The ability of each controller to boot the node may vary depending on the status of these internal connections.

FIG. 5A illustrates one example of evaluating internal functionality of the FRUs in a node. Here, using node 115A as example, the communication module 305A may send a low-power instruction or probe message to memory element 310A where both components are locating on the same FRU (i.e., data interface card 120A). As discussed above, the communication module 305A may send the low-power instruction or probe in response to receiving the command from one or more of the controllers (not shown). Because the communication module 305A may rely on certain configuration data in the memory element 310A in order to initialize, if either the memory element 310A or the connection 505 to the memory element 310A is non-functional, the communication module 305A may not be able to initialize thereby limited the performance of the FRU.

Returning to FIG. 4, at block 415, the controllers may evaluate the functionality and data dependencies between the FRUs in each node. Here, the controllers may send instructions to the connected FRUs which then test the connections between other FRUs that need to be functional for the node to boot properly. Notably, not every connection between the FRUs need to be functional for the node to boot, and thus, the FRUs may receive a list of select inter-FRU connections to test from the controller or may have a preconfigured list already stored in memory.

FIG. 5B illustrates one example of testing data dependencies between FRUs in node 115A. Here, the translation module 325A in one FRU (data interface card 120A) may rely on information stored in a second FRU (memory element 320A) when booting the node 115A. For instance, the memory element 320A may include register initialization values used by the translation module 325A when converting between different communication protocols. Without these values, the data interface card 120A may be unable to properly initialize.

In response to a prompt for a controller, the translation module 325A may send out a low-power instruction or probe to memory element 320A. If the connection 510 and the memory element 320A are functional, the translation module 325A receives a confirmation message from the memory element 320A. Based on this confirmation message (or lack thereof), The translation module 325A may report the status of the inter-FRU data dependency to the coupled controllers.

FIG. 5B also illustrates a second inter-FRU data dependency between the processor 125A and the memory element 320A. Like translation module 325A, the processor 125A may transmit the low power instruction or probe to memory element 320A in response to a prompt from one or more of the controllers 110. If the connection 515 and memory element 320A are functional, the element 320A transmits the confirmation message back to the processor 125A which can report the status of the inter-FRU data dependency to the coupled controller or controllers.

Returning to FIG. 4, at block 420 the controllers evaluate the functionality of the connections between the FRUs in each node and the controllers. Here, the controllers may test the functionality of the direct connections between the FRUs and controllers as well as the funcality of the components within the FRUs that are directly connected to the controllers. To do so, the commands sent by the controllers may request that the FRUs transmit confirmation messages if they received the message and are current functioning.

In one embodiment, connections between the controllers and the FRUs may be functioning so long as the component directly connected to the controller is functional and data can flow on the link between the component and the controller. Using FIG. 5C as an example, the communication module 305A (which has a direct connection to the controllers) may inform the controllers that it is functional so long as data is flowing on the respective connection to the controllers (e.g., connection 520 or 525) and the component itself is functional. If there is a problem with any intra-FRU or inter-FRU data dependencies as determined in blocks 410 or 415, the FRUs may report this separately to the controllers.

In another embodiment, however, the components directly connected to the controller may inform the controllers that they are functioning only if the intra-FRU and inter-FRU data dependencies are also functional as determined in blocks 410 and 415. For instance, the communication module 305A may first determine whether the intra-FRU connection 505 to the memory element 310A is functional before reporting its status to the controllers 110A and 110B. Likewise, the translation module 325A may ensure the inter-FRU connection 510 to the memory element 320A is functional before reporting its status to the controllers 110A and 110B.

Regardless of how the evaluations are reported to the controllers, at block 425, the controllers may collectively select the master based on which controller can boot up the most nodes in the computer system. In one embodiment, this may be done by determining which controller has the most functional connections to the FRUs in the node. Returning to FIG. 3, controller 110A may have a functional connection to all the various FRUs (and there various components) while controller 110B does not—e.g., the connection between controller 110B and processor 125B may be severed. As such, the node 115A may be initialized only if controller 110A is selected as the master controller.

Additionally, the computer system may also evaluate the level of functionality of the node when choosing the master controller. For example, both controllers 110A and 110B may be capable of initializing node 115A but one of the controllers 110 may enable more functionality of the node 115A. For instance, both controllers 110 may have functional connections to all the FRUs necessary to boot the node 115A but controller 110B may have more functional connections to non-essential FRUs. This may mean some of the FRUs cannot be used if controller 110A were selected as the master. Nonetheless, controller 110B is still able to initialize the node 115A albeit with limited functionality. As such, in addition to considering whether a controller 110 can initialize the nodes 115, the controllers may also consider if the initialized node 115 has limited functionality relative to other controllers 110 coupled to the node. Considering functional connections to the FRUs not needed to boot the node may be helpful as a tiebreaker when determining which controller 110 to select as master if they can boot the same number of nodes 115.

In one embodiment, the computer system may determine the availability of the different FRUs by evaluating the functionality of the FRUs (e.g., intra-FRU data dependencies), the functionality of connections between FRUs (e.g., inter-FRU data dependencies), and the connections between the controller and the FRUs. For example, to determine the functional status of the processor 125A in FIG. 2, the controller 110A may send an instruction to determine if the processor 125A is functional. This may require the processor 125A to execute, and return the results of a diagnostic analysis. Additionally or alternatively, the processor 125A may check the connections between different components (not shown) within the processor 125A (i.e., intra-FRU data dependencies). Moreover, because the memory element 320A may store information used when initializing the processor 125A, the processors 125A determines whether the memory element 320A and the data connection to the element 320A are functional (e.g., an inter-FRU data dependency). Furthermore, the method 400 determines whether the data connection between the controller 110A and the processor 125A is functional. If all of the these connections and components are functional, the controller 110A may set the status of processor 125A as functional. By repeating this method 400 for each of the FRUs and/or components in the node 115A that are coupled to the controllers 110, the controllers 110 can assign a functional status for each node. For example, if controller 110A determines that the processor 125A and data interface cards 120A and 120B are all functional by repeating blocks 410-420 of method 400, then the controller 110A determines it is capable of initializing node 115A.

In one embodiment, the computer system may assign a score to each controller based on the number of nodes each controller can initialize or boot. If a controller can initialize a node it may be given a predefined number of points. Each node may be assigned the same value or may be assigned different values (e.g., some nodes may be more important than others). Regardless of the particular technique used, the controller may select a master controller based on the number of nodes each controller can initialize.

One way that method 400 of FIG. 4 differs from method 200 of FIG. 2 is that method 400 evaluates the intra-FRU and inter-FRU data dependencies that may be needed for successfully initializing the nodes. That is, in addition to determining whether the connection between the controllers and the FRUs are functional, method 400 determines whether connections between different components in the FRU (as well as the components themselves) are functional.

In one embodiment, method 400 may be repeated as FRUs and/or controllers are hot swapped. For example, a node (or FRUs within the node) may be swapped out with new components in order to fix a faulty connection or component. Because this may change the number of nodes a controller can communicate with, the computer system may repeat method 400 to determine if a different controller may be the best candidate controller for being the master. Of course, because the computer system is already operating in this example, the system may use other techniques besides low-power instructions to determine the functionality of the FRUs on the nodes.

The blocks in method 400 may be performed sequentially or two or more of the blocks may be performed in parallel. For instance, blocks 410, 415, and 420 may be performed sequentially in any order. Alternatively, two or more of the blocks 410, 415, and 420 may be performed in parallel. For example, the computer system may evaluate the internal functionality of the FRUs at block 410 at the same time the functionality between two of the FRUs in the node is being determined at block 415.

CONCLUSION

A computing system may include a plurality of redundant components in order to increase the availability of the system. In one example, the redundant components may be FRU which allows a technician lacking in-depth product knowledge to isolate and replace faulty components. If one component in the FRU is non-functional, thereby limiting the function of the computing system, the entire FRU may be easily replaced.

To select a master controller to use when booting, a computing system may consider whether the components within the FRUs are functional as well as the data dependencies between the FRUs. The computing system may identify what FRUs and what components within the FRU are needed to boot the node. The computing system may then send instructions to each of the FRUs to determine if these components are functional. For example, a data interface card may include an internal memory element that stores data required when booting the node. Even though the connection between the controllers and the data interface card is functional, but the memory element is not functional, the controller may be unable to boot the compute node. Similarly, one FRU may depend on data from another FRU in order to boot. For example, a processor may need a clock signal from the data interface card. If the clock or the communication link between the clock and the processor is non-functional, the node may fail to boot. Based on these evaluations, the computer system determines the number of nodes each of the controllers can boot and which controller to select as the master.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A computer program product for selecting a master controller from a plurality of controllers, each with at least one connection to each of a plurality of compute nodes, each compute node comprising at least one field replaceable unit (FRU), the computer program product comprising:
a computer-readable storage medium having computer-readable program code embodied therewith, the computer-readable program code comprising computer-readable program code configured to:
determine a status of an inter-FRU connection between a first FRU and a second FRU in a same one of the plurality of compute nodes, wherein the inter-FRU connection is required in order to initialize the first FRU during a system boot;
determine a status of an intra-FRU connection between components within the first FRU, wherein the intra-FRU connection is required in order to initialize the first FRU during the system boot;
determine a status of connections between each of the plurality of controllers and at least one FRU in each of the plurality of computer nodes;
determine, based on the statuses, a respective number of the plurality of compute nodes each of the plurality of controllers can initialize when performing the system boot; and
select a master controller from the plurality of controllers to use when performing the system boot based on which of the plurality of controllers can initialize a greatest number of the plurality of compute nodes.

2. The computer program product of claim 1, wherein the computer-readable program code configured to:
determine statuses of each inter-FRU connection and intra-FRU connection of the same compute node that are required to initialize the same compute node during the system boot; and
upon determining that the statuses of each inter-FRU connection and each intra-FRU connection and a status of a connection between at least one FRU in the same compute node and a first one of the plurality of controllers are functional, update a score of the first controller to indicate that the first controller is able to boot the same compute node.

3. The computer program product of claim 1, wherein, when determining the statuses, the plurality of compute nodes are in an uninitialized state.

4. The computer program product of claim 1, wherein one of the plurality of controllers is able to initialize one of the plurality of nodes only if (i) a connection between the one controller and each of the FRUs in the one compute node coupled to the one controller is functional, (ii) each intra-FRU connection of each of the FRUs coupled to the one controller that is required to perform the system boot is functional, and (iii) each inter-FRU connection of each of the FRUs coupled to the one controller that is required to perform the system boot is functional.

5. The computer program product of claim 1, wherein the first FRU is dependent on data provided by the second FRU for the first FRU to properly initialize during a system boot.

6. The computer program product of claim 1, wherein the components of the first FRU comprises a first component and a second component, wherein the intra-FRU connection is between the first and second components, the first component is dependent on data provided by the second components for the first FRU to properly initialize during a system boot.

7. A system, comprising:
a plurality of controllers;
a plurality of compute nodes, each comprising at least one FRU, wherein each controller comprises at least one connection to each of the plurality of compute nodes; and
control logic configured to:
determine a status of an inter-FRU connection between a first FRU and a second FRU in a same one of the plurality of compute nodes, wherein the first connection is required in order to initialize the first FRU during a system boot;
determine a status of an intra-FRU connection between components within the first FRU, wherein the intra-FRU connection is required in order to initialize the first FRU during the system boot;
determine a status of connections between each of the plurality of controllers and at least one FRU in each of the plurality of computer nodes;
determine, based on the statuses, a respective number of the plurality of compute nodes each of the plurality of controllers can initialize when performing the system boot; and select a master controller from the plurality of controllers to use when performing the system boot based on which of the plurality of controllers can initialize a greatest number of the plurality of compute nodes.

8. The system of claim 7, wherein the control logic is configured to:
determine statuses of each inter-FRU connection and intra-FRU connection of the same compute node that are required to initialize the same compute node during the system boot; and
upon determining that the statuses of each inter-FRU connection and each intra-FRU connection and a status of a connection between at least one FRU in the same compute node and a first one of the plurality of controllers are functional, update a score of the first controller to indicate that the first controller is able to boot the same compute node.

9. The system of claim 7, wherein, when determining the statuses, the plurality of compute nodes are in an uninitialized state.

10. The system of claim 7, wherein one of the plurality of controllers is able to initialize one of the plurality of nodes only if (i) a connection between the one controller and each of the FRUs in the one compute node coupled to the one controller is functional, (ii) each intra-FRU connection of each of the FRUs coupled to the one controller required to perform the system boot is functional, and (iii) each inter-FRU connection of each of the FRUs coupled to the one controller required to perform the system boot is functional.

11. The system of claim 7, wherein the first FRU is dependent on data provided by the second FRU for the first FRU to properly initialize during a system boot.

* * * * *